(12) United States Patent
Cheema

(10) Patent No.: US 7,822,183 B1
(45) Date of Patent: Oct. 26, 2010

(54) CONVERTING A TOLL CALLING AREA TO AN EXTENDED AREA SERVICE

(75) Inventor: Farooq I. Cheema, Raleigh, NC (US)

(73) Assignee: Embarq Holdings Company LLC, Overland Park, KS (US)

( * ) Notice: Subject to any disclaimer, the term of this patent is extended or adjusted under 35 U.S.C. 154(b) by 1442 days.

(21) Appl. No.: 11/226,755

(22) Filed: Sep. 14, 2005

(51) Int. Cl.
  *H04M 15/00* (2006.01)
(52) U.S. Cl. .............. 379/112.06; 379/115.02; 379/114.03
(58) Field of Classification Search ............ 379/115.02, 379/114.03, 112.06, 114.02, 114.08, 219, 379/221.05, 221.06
See application file for complete search history.

(56) References Cited

U.S. PATENT DOCUMENTS

| 3,870,823 | A | * | 3/1975 | Gayler et al. | 379/126 |
| 4,849,971 | A | * | 7/1989 | Karras et al. | 370/271 |
| 7,076,047 | B1 | * | 7/2006 | Brennan et al. | 379/219 |

* cited by examiner

*Primary Examiner*—Olisa Anwah
(74) *Attorney, Agent, or Firm*—Matthew P. Harlow

(57) ABSTRACT

Converting a toll calling area to an extended area service (EAS) is provided. The present invention allows customer, regional, and equipment data to be collected into a computing device with a set of assumptions. The data is processed using calculations, regression analysis, and statistics to provide a migration plan in an automatic manner. Results may be derived from the various information detailing an impact of migrating to an EAS.

30 Claims, 4 Drawing Sheets

CONVERTING A TOLL CALLING AREA TO AN EXTENDED AREA SERVICE

CROSS-REFERENCE TO RELATED APPLICATIONS

Not applicable

STATEMENT REGARDING FEDERALLY SPONSORED RESEARCH OR DEVELOPMENT

Not applicable.

BACKGROUND OF THE INVENTION

With today's local telephone service, there are a variety of calling plans that a customer may have. The calling plans vary from one service provider to another, but typically, a service provider may include a calling plan for local telephone service and long distance telephone service. The local telephone service may include features such as a flat rate dialing or a measured rate dialing. The long distance telephone service may include a feature called toll calling.

The flat rate dialing allows the customer to dial another customer as many times as possible but only pay a flat fee over a set period. Usually, this period is a month, but may be longer or shorter depending on the features offered by the service provider. The service provider, with approval from a public utility commission or public service commission, establishes a region whereby the customer may use the flat rate dialing. The region may be a physical area encompassing many customers such as a city, suburb, or metropolitan area. Or, the region may be defined by a number of telecommunication switches located in a particular area. In either case, the flat rate dialing is established over a fixed area. Within that area, customers may call each other as many times as possible for the flat rate.

The measured rate dialing is similar to flat rate in that a fixed area is established for the customer to dial other customers. However, the customer's rate for the local call may vary depending on the distance or time of the telephone call. For example, a telephone call to a customer two miles away may be cheaper than a telephone call to another customer five miles away. Likewise, a telephone call lasting ten minutes may be cheaper than a telephone call lasting thirty minutes, even though the telephone call may be made to the same customer.

The type of local telephone service that the customer may have depends on the offerings of the service provider and the type of package selected by the customer. In either case, a fixed area or region is involved to establish boundaries or limits for the local telephone service. These boundaries or limits are usually explained to customers in details so that the customer understands how their local telephone service may be used.

The customer may have long distance telephone service to complement the local telephone service. Since local telephone service only allows the customer to call another customer within a certain distance, long distance telephone service allows the customer to extend that reach to call other customers that are located at a greater distance from their home or business. Long distance telephone service may be defined as telephone service extended beyond the local telephone service.

A particular type of long distance telephone service is toll calling. One may find various definitions for toll calling using such terms as in-state long distance, regional toll, local long distance, or shorter distance calls. Toll calling usually includes telephone calls made at greater distances than local telephone calls. In some cases, toll calling may be viewed as the grey area of telephone dialing. In one aspect, it looks like it should be included in the local telephone service given the distances involved. In another aspect, it looks like it should be included in the long distance telephone service for the same reason. Regardless of either aspect, toll calling may include rates that are charged on a per call basis. This means that each telephone call is charged for time or distance for the telephone call. However, some service providers have become creative in their product offerings and now offer toll calling on a flat rate basis similar to local telephone service. With any plan that is accepted for toll calling, the customer may usually pay more for toll calling than local telephone service because of the distances involved in dialing other customers.

As mentioned above, the public utility commission or public service commission is usually involved in determining and approving local calling areas and toll calling areas. References to the public utility commission or public service commission in this document shall be made with the acronym PUC.

One of the main functions of the PUC is to regulate rates and tariffs associated with telephone service in a particular area. PUCs may be found in various states and counties throughout the United States and usually provide information regarding service providers, rate plans, and other information for consumers. In regulating telephone service, PUCs make changes from time-to-time in the calling plans of service provider based on a variety of factors. For example, if a metropolitan area has grown in size, the PUC may require service providers to enlarge the local calling area. The PUC may also impose the type of rate plans that may be offered in the local calling area. Likewise, the PUC may enlarge the toll calling area and control rates in this type of calling also.

One problem that has occurred in recent years involve establishing clear boundaries between local calling and long distance calling. Over the years, communities have grown and technology has improved such that a local calling area may include more than one telecommunication exchange or switch. Oftentimes, the telecommunication exchange boundaries are located in awkward places and do not coincide with the community, causing the community to use toll calling for what should be local calling. This means that the customers in this situation may pay higher rates for telephone calls that really should be treated as local calls. This situation can happen when there is an explosion of population growth in the community. For example, it may seem awkward to allow local calling for a customer in a northern part of a town to call another customer in a southern part of the town at some distance of twenty miles away, but impose toll calling on the customer in the northern part of the town when a call is made to another customer in an adjoining neighborhood two miles to the north. PUCs have tried to rectify this problem by allowing a type of local calling called extended area service (EAS).

EAS may be viewed as local calling with special attributes. EAS grew out of the need from customers to have local calling although the distance of the telephone calls may be similar to that seen under toll calling. PUCs allow EAS in order to allow customers in a particular area to call other customers on either a toll-free basis or a reduced rate basis. In either case, the rates charged for telephone calls to an EAS are cheaper or more economical than if the EAS was still a toll calling area.

In many situations, PUCs provide procedures for customers to petition the PUCs to hear complaints regarding service providers. In the procedures, the PUCs accept petitions from customers to allow conversion of a toll calling area to EAS. Usually, the customer has to prove why an area should be converted from the toll calling area to EAS. This step may include various hearings but it is one mechanism to get the toll calling area changed to an EAS area. In another case, PUCs may undertake the responsibility unilaterally to impose on service providers the burden to change from the toll calling area to EAS. This may occur if their has been a significant growth in the community beyond an established local calling area, or if the PUC has received a lot of complaints as to the rates charged for calling a particular area.

When the PUC approves or impose the plan to convert a toll calling area to an EAS, service providers have the burden of making all of the equipment changes to handle the potential increased in dialing. The service providers may perform studies to determine the right resources needed to handle the new dialing area. The service provider have to educate their customers on the new EAS. Usually, PUCs allow the service providers to recoup the costs associated with migrating from the toll calling area to EAS. However, the service providers must prove their costs and provide reports regarding their plans and progress.

Today, the process for converting from the toll calling area to EAS is manually-driven and takes a very long time to implement. Information has to be gathered regarding the current local calling area and the customers that reside in it. Information has to be gathered regarding the proposed EAS and the customers in that area too. In addition, information has to be calculated regarding the current telephone call volume and the potential increase in telephone call volume that may occur after an area is converted to EAS. Each telecommunication exchange may be examined to determine the increase in capacity that may be needed and the billing structure that may be imposed. Also, there may need to be a plan for provisioning new telecommunication exchanges, and facilities associated with the telecommunication exchanges. The facilities may include a plan for increased number of trunks between two areas. A trunk is a communications path connecting two telecommunication exchanges or switches in a network, used to establish an end-to-end connection.

A solution is needed that would provide a faster way to migrate customers from a toll calling area to an EAS. The solution should reduce engineering time in planning, calculating, and forecasting resources to perform the migration. It should also allow a smoother transition and a better flow of information when involving multiple organizations to carry out the migration. Information may be available faster to the various organizations that may need it.

SUMMARY OF THE INVENTION

This disclosure describes, among other things, systems and computer-readable media for converting a toll calling area to an extended area service.

In accordance with the present invention, a computer system having a processor, a memory and an operating environment to execute a method for converting a toll calling area to an extended area service (EAS) is provided that includes receiving information associated with customers and regions. Telephone call information is calculated from the information associated with the customers or the regions. An expected growth in a telephone call volume is determined for the customers or the regions. An output of calculated information is provided based on the telephone call information and the expected growth.

In another aspect, one or more computer-readable media having computer-readable instructions embodied thereon for causing a computing device to perform a method for converting a toll calling area to an extended area service (EAS) is provided that includes receiving information associated with customers and regions. Telephone call information is calculated from the information associated with the customers or the regions. An expected growth in a telephone call volume is determined for the customers or the regions. An output of calculated information is provided based on the telephone call information and the expected growth.

In yet another aspect, a computer system having a processor, a memory and an operating environment to execute a method for evaluating a migration from a toll calling area to an extended area service (EAS) is provided that includes receiving customer data. The customer data is associated with making telephone calls. A number of customers is determined in a customer region or a proposed extended area service (EAS) region. A percentage of calls for the customers in the customer region is determined. The percentage is a number of calls made by the customers to the proposed EAS region divided by a total number of calls made by the customers. A growth in the number of customers or the number of calls is calculated using a regression analysis with the customer data. An amount of resources associated with the growth is determined. Results are provided for the migration.

In yet another aspect, one or more computer-readable media having computer-readable instructions embodied thereon for causing a computing device to perform a method for evaluating a migration from a toll calling area to an extended area service (EAS) is provided that includes receiving customer data. The customer data is associated with making telephone calls. A number of customers is determined in a customer region or a proposed extended area service (EAS) region. A percentage of calls for the customers in the customer region is determined. The percentage is a number of calls made by the customers to the proposed EAS region divided by a total number of calls made by the customers. A growth in the number of customers or the number of calls is calculated using a regression analysis with the customer data. An amount of resources associated with the growth is determined. Results are provided for the migration.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

Figure 1A:
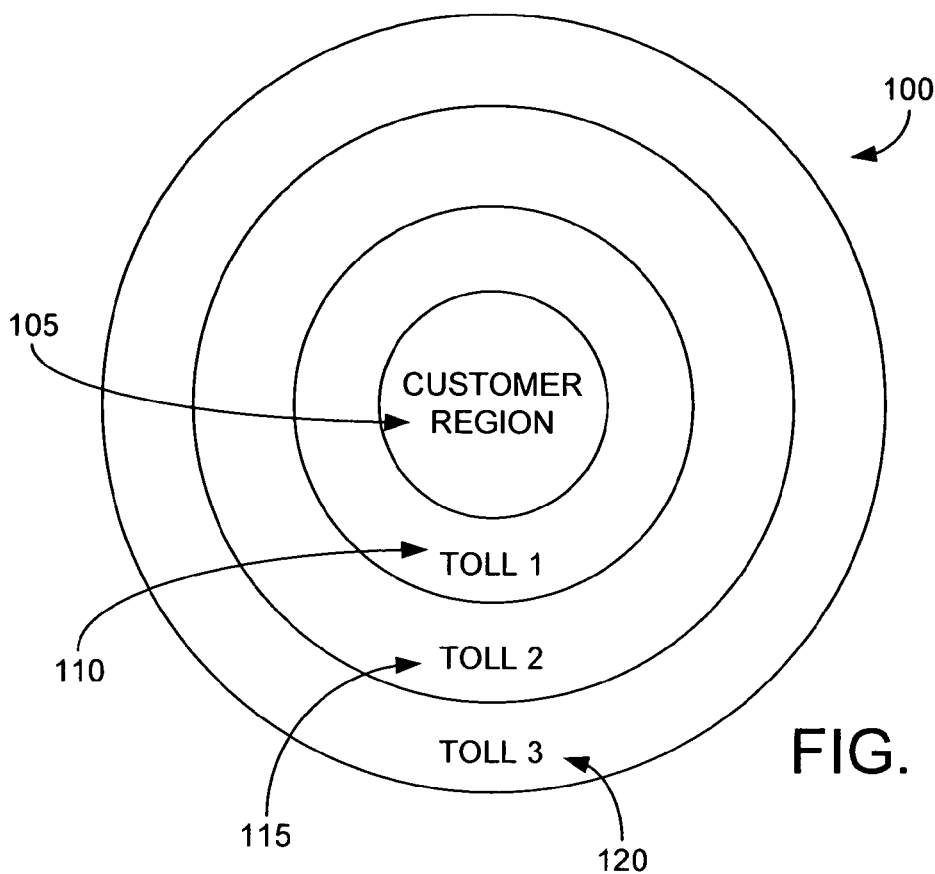
FIGS. 1A and 1B are block diagrams representing calling areas in concentric patterns.

The present invention will be better understood from the detailed description provided below and from the accompanying drawings of various embodiments of the invention, which describe, for example, systems and computer-readable media for converting a toll calling area to an extended area service (EAS). The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and non-volatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, an embodiment will now be referenced in connection with a computing network. Although the present invention can be employed in connection with a computing-network environment, it should not be construed as limited to the exemplary applications provided here for illustrative purposes.

Toll Calling Area to Extended Area Service Migration

A computing device may operate with computer software to perform various functions to convert a toll calling area to an extended area service. Various data may be provided to the computing device to allow a conversion plan to automatically be created. In addition, inputs may be provided using a set of assumptions that may be changed depending on the circumstances. The computing device may be a computer, a server, a workstation or an electronic handheld device. The computing device may also be a set of computing devices connected and working together over network connections.

Figure 1B:
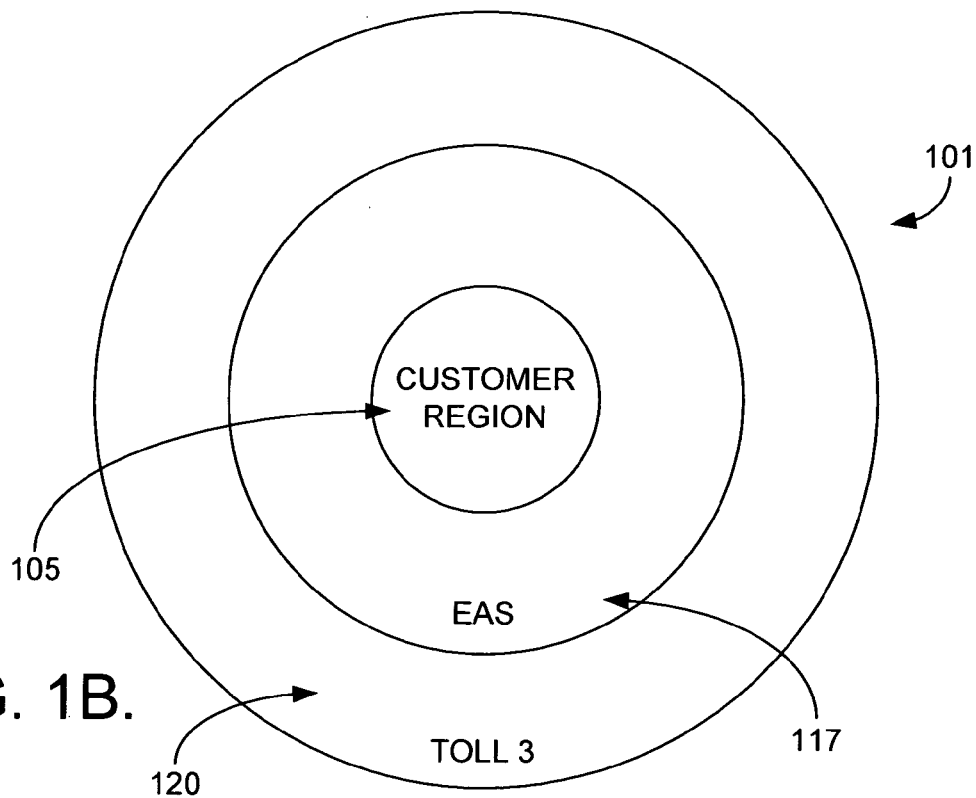

In FIGS. 1A and 1B, block diagrams representing different calling areas in concentric pattern are shown in diagrams 100 and 101. FIG. 1A illustrates a customer region 105, and toll areas 110, 115, and 120. Prior to conversion to an EAS, a customer in customer region 105 may have local calling in customer region 105. Beyond customer region 105, the customer may pay a toll rate for toll calling a person in toll areas 110, 115, or 120. As shown in FIG. 1A, the rates for calling toll areas 110, 115, and 120 from customer region 105 may vary but typically, may increase when moving from a proximity close to customer region 105 to a far end of toll area 120.

For EAS to occur for customers located in an area represented by diagram 100, several factors may occur. The customers in a community in customer region 105 may grow beyond the boundaries reflected by customer region 105 into toll area 110 and beyond. There may be a growth increase in the customers in toll area 110 or toll area 115 with an increased telephone call volume to customer region 105. In any case, a plan may be approved or imposed by the PUC or other governmental body to migrate toll areas 110 and 115 to EAS as shown in FIG. 1B.

An embodiment of the present invention allows a plan to be created automatically that converts a toll calling area to EAS as shown in FIG. 1B. In FIG. 1B, customer region 105 and toll area 120 are shown similar to their depiction in FIG. 1A. However, an EAS 117 exists adjacent to customer region 105. EAS 117 is a result of a conversion from toll areas 110 and 115 in FIG. 1A. With EAS 117, customers may have a lower rate for calling between customer region 105 and EAS 117. However, customers within customer region 105 may still pay a toll rate for telephone calls to toll area 120 since toll area 120 did not convert to EAS. EAS 117 may be viewed as an extended local service. Even with EAS, a service provider may provide a variety of calling plans such as flat rate dialing or measured rate dialing. However, the rates involved in these new plans may be cheaper or more economical than the toll rate dialing.

Figure 2:
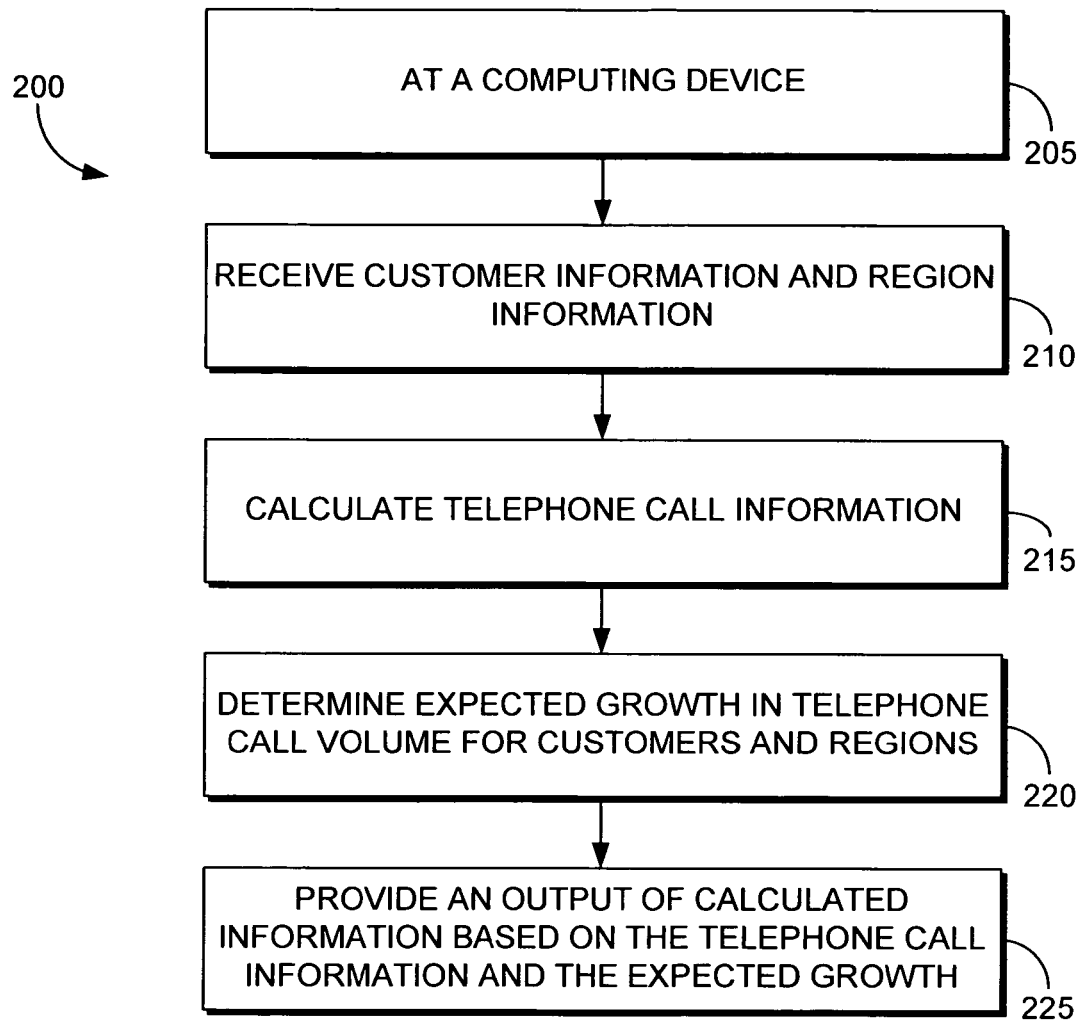
FIG. 2 is a flowchart of an exemplary process for implementing an embodiment of the present invention.

Turning now to FIG. 2, a process for implementing a conversion from toll calling to EAS is provided in a method 200. Method 200 may operate on a computing device as shown in a step 205 to automatically provide information to convert a toll calling area to an EAS. At the computing device, customer information and region information may be received in a step 210. This information may include files of data that may be received at the computing device. Or, it may include manual inputs and assumptions to enable calculations to occur on the data. Customer information may be information pertaining to a number of customers in customer region 105 or other places. Customer information may also be telephone call information. Region information may pertain to the physical area or it may include data on telecommunication equipment and facilities. For example, it may be desirable to know the number of telecommunications exchanges in customer region 105 and toll areas 110, 115, and 120.

With the collected information, telephone call information is calculated in a step 215. Telephone call information may calculate various percentages and statistics regarding the different regions and the customers located within those regions. For example, telephone call information may include determining a percentage of customers in customer region 105 making telephone calls to toll areas 110 and 115. As shown above, toll areas 110 and 115 are the targeted areas to be converted to EAS 117. With implementations of embodiments of the present invention, various percentages and other information may be created as telephone call information. The list is by no means exhaustive in the types of telephone call information that may be available. The present invention allows this information to be used to reach an intended output of information to perform the conversion from the toll calling area to EAS.

With the present invention, an expected growth in telephone call volume may be determined in a step 220. This step allows an implementer to determine the changes that may occur over a period of time when a region or area changes to EAS. Step 220 may be used to forecast an increase in call volume as well as an increase in the number of customers in both customer region 105 and toll areas 110 and 115 once the conversion occurs.

In a step 225, an output of calculated information may be provided based on the telephone call information and the expected growth. With a combination or sub-combination of the telephone call information and the expected growth, various outputs may be created and used for different purposes. For example, a set of reports may be created that may include statistical information about the different regions. Entities such as the PUC may use this information for their planning purposes. In addition, reports may be provided to the PUC as a means for providing proof of costs involved in performing the conversion. The output may include costs for provisioning additional facilities in the network, re-configuring the telecommunication exchanges to handle EAS, and changing the billing structure and rate plans for the calling areas. The output may also include a subset of information determined during the implementation of the present invention that may be used by various organization to enable them to perform additional activities or functions in the conversion process.

The types of outputs that may be created in the present invention are not limited by the examples shown above. Depending on the implementation, various outputs may be created using the telephone call information and the expected growth. For example, two different regions may have a need to convert their respective toll calling areas to EAS. However, outputs may differ. One region may provide a number of reports to the PUC while the other region may have a requirement to provide detailed information to customers in the region. The idea here is to convey the flexibility that may be encountered with step 225 in generating an output.

Figure 3:
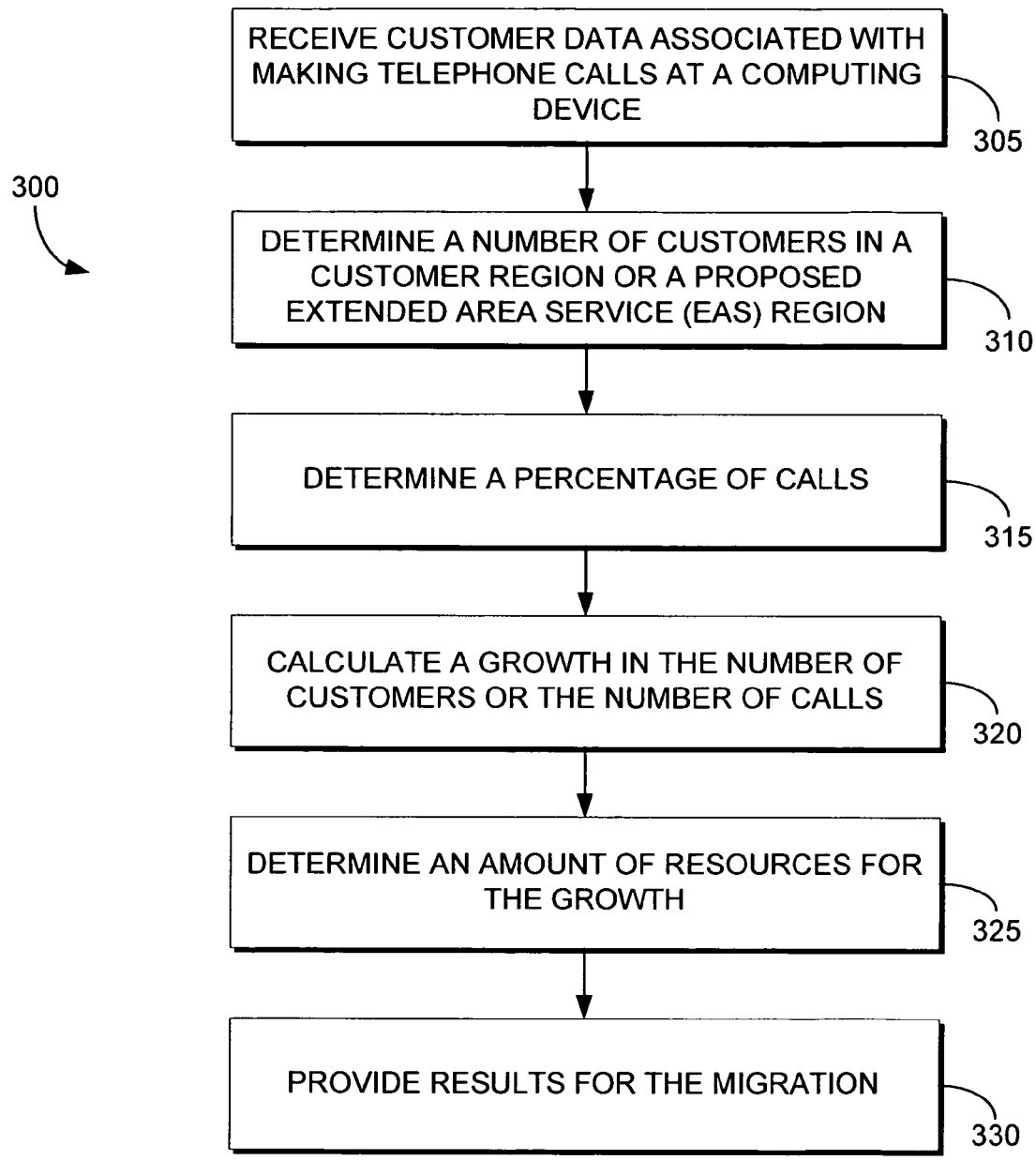
FIG. 3 is a flowchart of another exemplary process for implementing an embodiment of the present invention.

Turning now to FIG. 3, another process for implementing a conversion from toll calling to EAS is provided in a method 300. Similar to step 210, customer data associated with making telephone calls is received at a computing device in a step 305. Customer data may be gathered by a service provider in various ways or the customer data may be provided to the service provider by the PUC. Many PUCs track information related to customers and telephone call usage. This information may be provided to the service provider in the form of manual reports whereby data may be manually loaded into the computing device. Or, the information may be provided electronically enabling a user to automatically load and extract relevant data in the computing device.

In a step 310, a number of customers are determined in a region or a proposed EAS. The number of customers enable the service provider to determine the amount of changes that may occur in calling behavior once an area converts to EAS. For example, customers may be willing to do more calling when the rates and tariffs are lower for EAS rather than when the rates and tariffs are for a toll calling area. Without performing additional steps, the service provider may use the information determined in step 310 to understand if the calling behavior of customers may impact the resources in the regions to maintain EAS. Also, the service provider may determine in step 310 the current level of capacity for existing telecommunication equipment and facilities.

With the customer data and information determined in step 310, various percentages may be determined for information as may be needed. For example, the service provider may want to know the percentage of calls that occur between customer region 105 and EAS 117 over all of the telephone calls that may occur. The service provider may want to know the percentages of calls occurring during a peak busy hour period. Or, the service provider may want to know the percentage of calls in relation to the volume of calls occurring at each telecommunication exchange. These are some of the examples of the percentages that may be determined. However, other percentages may be calculated in implementing an embodiment of the present invention.

In a step 320, a growth in the number of customers or the number of calls is calculated or forecasted. The growth of customers or calls may provide information that influences the amount of resources provisioned for the conversion. The service provider may need to determine growth needs to adequately plan the provisioning and layout of equipment over a time period. Growth information may be determined using a regression analysis or other model. For example, if customer data and other information have been collected over a period of time, it may be possible to predict future growth and trends using the regression analysis. The growth in the number of customers may be determined in both customer region 105 and toll calling areas 110 and 115. Likewise, the growth in the number of calls for both areas may be determined as well.

An amount of resources for the calculated growth may be determined in a step 325. The present invention allows for various calculations in determining the resources that may be desired for the conversion. A correlation may occur between the information determined for the customers and calls and the resources that may be provisioned. For example, telephone calls may be calculated in terms of minutes of use (MOUs), erlangs, or centum call seconds (CCS). These terms provide information that may be used to determine capacity for the telecommunication exchanges and facilities. For example, MOUs or CCS may be used to determine a number of trunks to provision between to points in the network. Erlangs may be used to determine the amount of increase that may be needed for a telecommunication exchange.

In a step 330, a set of results may be provided related to the migration. Step 330 is similar to step 225 in that various results may be provided depending on the implementation of the present invention. Reports may be generated for statistics, costs, and proposed plans. Interim results may be calculated for further use by additional organizations or additional implementations of the present invention.

Figure 4:
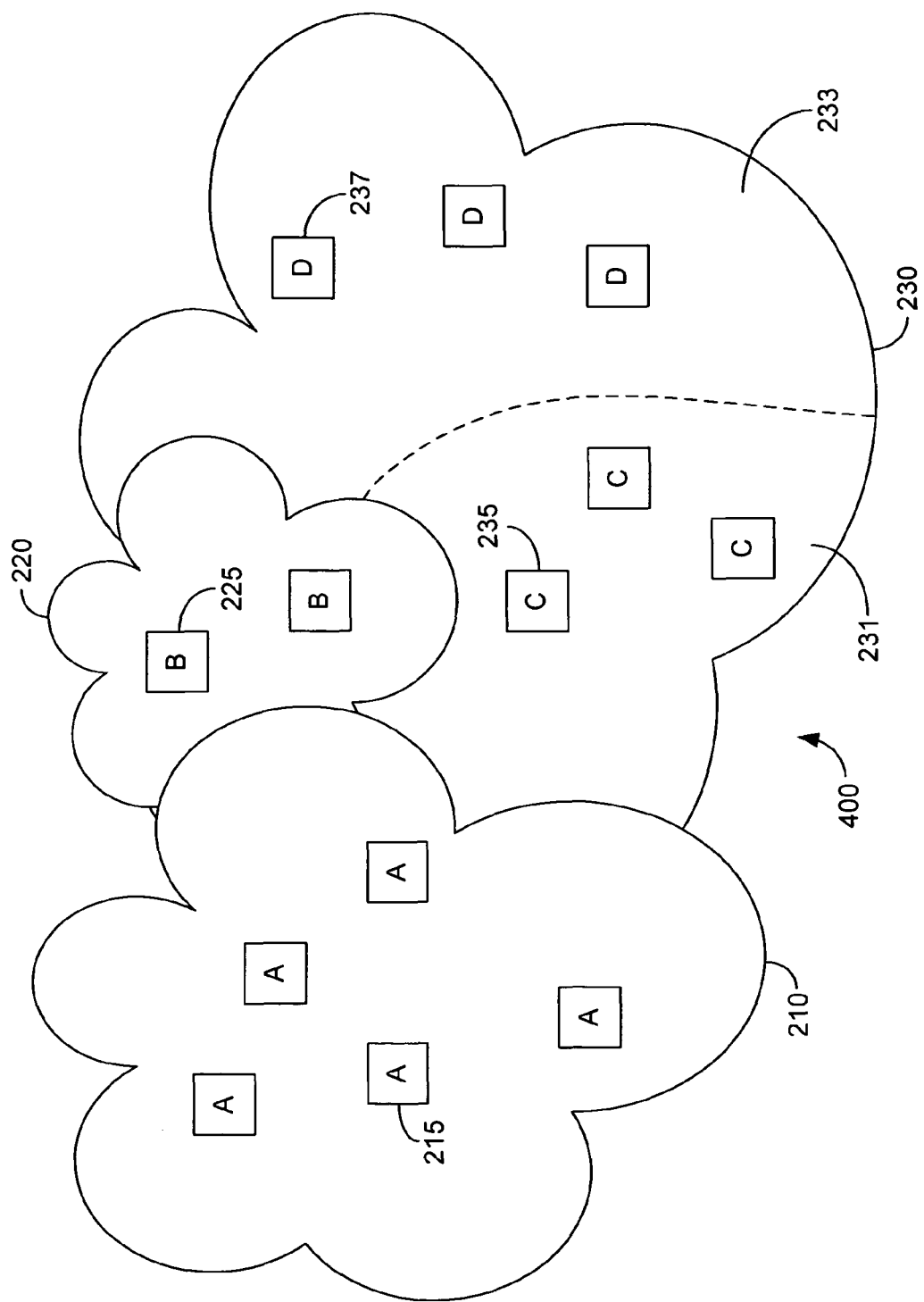
FIG. 4 is a block diagram illustrating a layout of a local calling area, a toll calling area, and an extended area service involved in implementing an embodiment of the present invention.

In FIG. 4, a block diagram illustrating a layout of a local calling area, a toll calling area, and an extended area service is shown in layout 400. Layout 400 includes local areas 210, 220, and 230. Local areas 210, 220, and 230 may represent calling areas with a number of customers located in them. Local areas 210, 220, and 230 have various telecommunications equipment located within their boundaries or various communities located as shown by a set of A 215, a set of B 225, a set of C 235, and a set of D 237. The sets of information may represent telecommunication equipment that may be found in a telecommunications network. For example, the sets of information may represent exchanges that connect the different customers. The sets of information may also represent communities within the local areas. Either representation of the sets of information (A 215, B 225, 235 and D, 237) may be used to implement and understand embodiments of the present invention.

Within local area 230, a determination to migrate to EAS may split a region. For local area 230, an EAS 231 and an EAS 233 may be found illustrating an impact of EAS for local area 230 in relation to local area 210. From local area 210, telephone calls to EAS 231 may have flat rate dialing while telephone calls to EAS 233 may have measured rate dialing.

A scenario may now be discussed to illustrate the considerations and results of implementing embodiments of the present invention. Local area 210 has incurred significant growth in customers over the past few years. It has grown to such a extent that there are now five (5) large exchanges located throughout local area 210 as shown by A 215. The growth of local area 210 has spilled over into local areas 220 and 230. However, a large number of telephone calls tend to occur between local area 210 and a western edge of local area 230. The PUC for the entire region has noticed the change in growth patterns and has taken notice of the calling patterns that currently exists with the population growth. However, the PUC has not implemented any changes in the calling rates, fees, and tariffs that may be imposed by the service providers for the last ten years. Service providers have been free to set rates, fees, and tariffs with a yearly percentage cap. As a result, the service providers have designated each local area a free calling area in local areas 210, 220, and 230 respectively. However, the service providers have imposed toll calling when calling from one local area to another local area. For example, if a customer in local area 210 calls another customer in either local area 220 or local area 230, the telephone call is treated as a toll call.

Customers in local area 210 petitioned the PUC to make local areas 210, 220, and 230 one large local calling area with a mixture of free calls, flat rate calls, and measured rate calls. The PUC approved a plan to make local area 230 an extended local calling area recognizing the increase in call volume that occurs between it and local area 210. However, the PUC imposed that local area 230 consists of two EAS, one with flat rate dialing as shown by EAS 231, and another with measured rate dialing as shown by EAS 233. The PUC did not approve changes to local area 220 which remains a toll calling area for customers in local area 210.

With the above information, the service provider may implement embodiments of the present invention to gather various information, make forecasts, take inventory, and create resource needs and plans to convert a toll calling area to EAS. In this scenario, from the perspective of customers in local area 210, local area 230 is the toll calling area which the customers want changed.

Information may be gathered and loaded into a computing device to determine the resources needed to convert the western half of local area 230 into EAS 231 with flat rate dialing for customers in local area 210. Likewise, the same or different information may be gathered and loaded in the computing device to determine the resources needed to convert the eastern half of local area 230 into EAS 233 with measured rate dialing. As shown in layout 400, telecommunication exchanges and facilities would be impacted by this change. The dialing plan may be altered in the network. The billing structure will be altered in the network. An increase in call volume may occur requiring capacity changes for the telecommunication exchanges and facilities.

The outputs from the plan created above may be in the form of various reports. Costs may be provided to the appropriate organizations. Interim progress reports may be created. Regulatory information may be created for the PUC to monitor activities. Technical documents may be created associated with the conversion, laying out the resource needs and manpower required to perform the conversion. These are just some of the outputs that may be created from this scenario when implementing various embodiments of the present invention.

As shown in the above scenario, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A computer system having a processor and a memory, the computer system operable to execute a method for converting a toll calling area to an extended area service (EAS), comprising:
   receiving a set of information associated with one or more customers and one or more regions;
   calculating a telephone call information from the set of information associated with at least one of the one or more customers and the one or more regions;
   determining an expected growth in a telephone call volume for at least one of the one or more customers and the one or more regions; and
   providing an output of a calculated information based on at least the telephone call information and the expected growth.

2. The system of claim 1, wherein receiving the set of information comprises receiving at least one of a set of assumptions, a customer usage information, and a set of regional data.

3. The system of claim 2, wherein the one or more regions comprise one or more areas serving the one or more customers, or one or more telecommunication devices serving the one or more customers.

4. The system of claim 3, wherein calculating the telephone call information comprises calculating at least one of a percentage of the one or more customers making calls, a percentage of calls between two or more regions, a peak busy hour call volume, a number of calls in a regions, the number of calls to the regions, the number of calls leaving the region, a minute of use (MOU), a centum call second (CCS), and an erlang.

5. The system of claim 4, wherein determining the expected growth comprises determining at least one of the expected growth in a region, the expected growth between two or more regions, an increase in a number of calls, an increase in one or more facilities, an increase in the one or more telecommunication devices, an increase in a number of customers, and a cost for the expected growth.

6. The system of claim 5, wherein the one or more facilities comprise a set of devices associated with the telecommunication devices.

7. The system of claim 6, wherein the one or more telecommunication devices are selected from the group including switching equipment, transmission equipment, and communications equipment.

8. The system claim 6, wherein providing the output of the calculated information comprises providing one or more reports based on converting the toll calling area to EAS.

9. The system of claim 6, wherein providing the output of the calculated information comprises providing one or more costs to migrate from the toll calling area to EAS.

10. One or more computer-storage media having computer-readable instructions embodied thereon for causing a computing device to perform a method for converting a toll calling area to an extended area service (EAS), comprising:
- receiving a set of information associated with one or more customers and one or more regions;
- calculating a telephone call information from the set of information associated with at least one of the one or more customers and the one or more regions;
- determining an expected growth in a telephone call volume for at least one of the one or more customers and the one or more regions; and
- providing an output of a calculated information based on at least the telephone call information and the expected growth.

11. The media of claim 10, wherein receiving the set of information comprises receiving at least one of a set of assumptions, a customer usage information, and a set of regional data.

12. The media of claim 11, wherein the one or more regions comprise one or more areas serving the one or more customers, or one or more telecommunication devices serving the one or more customers.

13. The media of claim 12, wherein calculating the telephone call information comprises calculating at least one of a percentage of the one or more customers making calls, a percentage of calls between two or more regions, a peak busy hour call volume, a number of calls in a regions, the number of calls to the regions, the number of calls leaving the region, a minute of use (MOU), a centum call second (CCS), and an erlang.

14. The media of claim 13, wherein determining the expected growth comprises determining at least one of the expected growth in a region, the expected growth between two or more regions, an increase in a number of calls, an increase in one or more facilities, an increase in the one or more telecommunication devices, an increase in a number of customers, and a cost for the expected growth.

15. The media of claim 14, wherein the one or more facilities comprise a set of devices associated with the telecommunication devices.

16. The media of claim 15, wherein the one or more telecommunication devices are selected from the group including switching equipment, transmission equipment, and communications equipment.

17. The media claim 15, wherein providing the output of the calculated information comprises providing one or more reports based on converting the toll calling area to EAS.

18. The media of claim 15, wherein providing the output of the calculated information comprises providing one or more costs to migrate from the toll calling area to EAS.

19. A computer system having a processor and a memory, the computer system operable to execute a method for evaluating a migration from a toll calling area to an extended area service (EAS), comprising:
- receiving a set of customer data wherein the customer data is associated with making telephone calls;
- determining a number of customers in at least one of a customer region and a proposed EAS region;
- determining a percentage of calls for the customers;
- calculating a growth in at least one of the number of customers and the number of calls;
- determining an amount of resources associated with the growth; and
- providing one or more results for the migration.

20. The system of claim 19, wherein determining the percentage of calls comprises determining the percentage of a number of calls made by the customers between the customer region and the proposed EAS region divided by a total number of calls made by the customers.

21. The system of claim 19, wherein calculating the growth comprises using a regression analysis with the set of customer data.

22. The system of claim 19, wherein determining the amount of resources comprises determining at least one of a set of facilities and a set of telecommunication equipment.

23. The system of claim 22, wherein providing the one or more results comprises providing one or more reports for the migration.

24. The system of claim 22, wherein providing the one or more results comprises providing one or more costs for the migration.

25. One or more computer-storage media having computer-readable instructions embodied thereon for causing a computing device to perform a method for evaluating a migration from a toll calling area to an extended area service (EAS), comprising:
- receiving a set of customer data wherein the customer data is associated with making telephone calls;
- determining a number of customers in at least one of a customer region and a proposed EAS region;
- determining a percentage of calls for the customers;
- calculating a growth in at least one of the number of customers and the number of calls;
- determining an amount of resources associated with the growth; and
- providing one or more results for the migration.

26. The media of claim 25, wherein determining the percentage of calls comprises determining the percentage of a number of calls made by the customers between the customer region and the proposed EAS region divided by a total number of calls made by the customers.

27. The media of claim 25, wherein calculating the growth comprises using a regression analysis with the set of customer data.

28. The media of claim 25, wherein determining the amount of resources comprises determining at least one of a set of facilities and a set of telecommunication equipment.

29. The media of claim 28, wherein providing the one or more results comprises providing one or more reports for the migration.

30. The media of claim 28, wherein providing the one or more results comprises providing one or more costs for the migration.

* * * * *